United States Patent [19]

Georgopapadakos et al.

[11] 4,067,706
[45] Jan. 10, 1978

[54] APPARATUS FOR GAS SCRUBBING AND PARTICULATE SOLIDS REMOVAL

[76] Inventors: Agis M. Georgopapadakos, 11820 NE. 158th, Bothell, Wash. 98011; George S. Sigalas, 5413 NE. 200th Place, Seattle, Wash. 98155

[21] Appl. No.: 718,457

[22] Filed: Aug. 30, 1976

[51] Int. Cl.² .................................................. B01D 47/10
[52] U.S. Cl. ........................................ 55/239; 55/222; 55/242; 55/257 C; 55/269; 261/79 A
[58] Field of Search ............... 55/239, 257 C, 235–238, 55/399, 222, 240, 242, 269; 261/79 A

[56] References Cited

U.S. PATENT DOCUMENTS

| 2,575,359 | 11/1951 | Ortgies | 55/238 |
|---|---|---|---|
| 2,817,415 | 12/1957 | Sykes | 55/236 |
| 3,618,299 | 11/1971 | Vincent | 55/238 |
| 3,918,940 | 11/1975 | Westlake et al. | 55/239 |

FOREIGN PATENT DOCUMENTS

| 490,240 | 8/1938 | United Kingdom | 55/237 |

Primary Examiner—Bernard Nozick

[57] ABSTRACT

Wet type gas scrubber in which gases are brought into a central column tangentially and swirled downwardly towards the scrubbing water in a settling tank. The gases are then reversed upwardly and outwardly of the central column where they are passed through a demister and out the scrubber stack. Steam and water spray headers are located so as to prevent the unit from clogging. Means are provided in the tank for removing the solids and particulates from the scrubber area and for preventing build-up or accumulations of solids under the scrubber.

8 Claims, 4 Drawing Figures

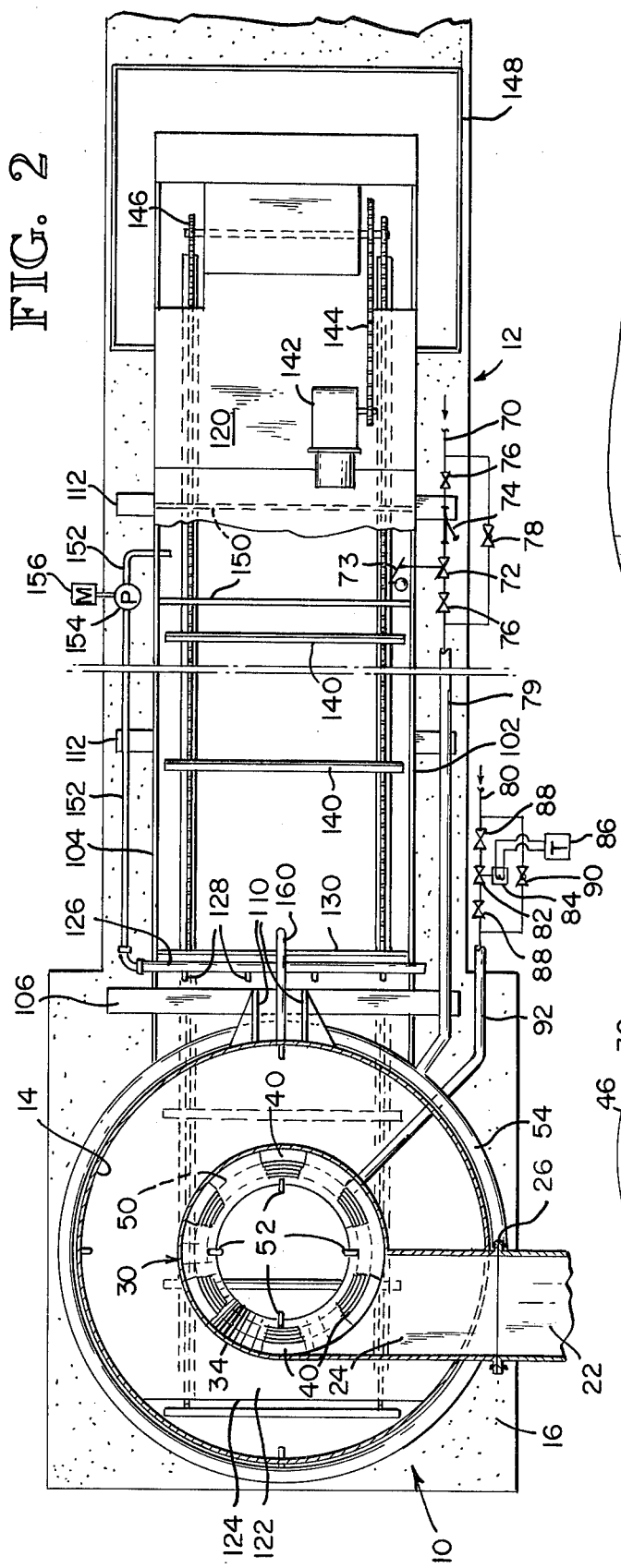
FIG. 2
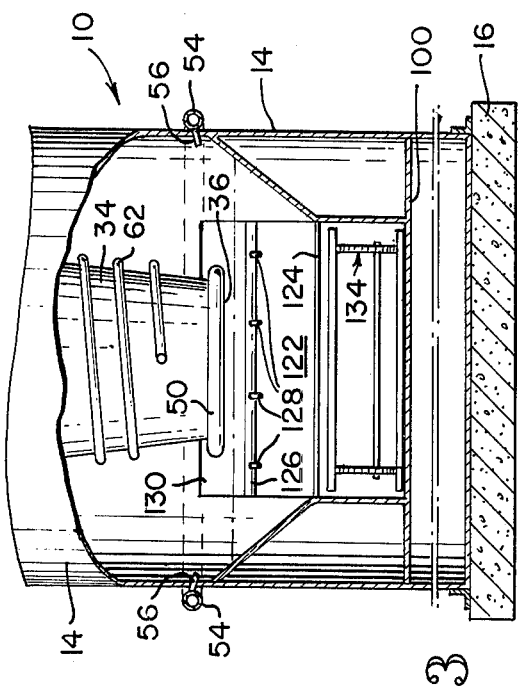
FIG. 3
FIG. 4

APPARATUS FOR GAS SCRUBBING AND PARTICULATE SOLIDS REMOVAL

BACKGROUND OF INVENTION

The invention relates generally to the area of removing contaminants from gas and air and more particularly to a wet type gas scrubber for removing particulate, solid materials from dirty air and gas, including a settling and clarifier tank.

Those skilled in the art are well aware that many types of wet scrubbers are available including scrubbers of the type in which a stream of flue gas is intimately contacted with a suitable scrubbing liquid for the purpose of removing particulate solids. Many of the drawbacks and disadvantages of prior art devices reside in their complexity. Because of the amount of pollutant material which a scrubber unit may have to handle, it can be easily clogged or slurry damaged. More specifically, sprays may become clogged and pumps, where they may be employed, become so fouled with the flow of pollutant material such as ash and soot that almost constant attention to the scrubber unit is required if it is to function properly. The treatment of dirty gases by wet scrubbers is ordinarily efficient in effecting the removal of the entrained solids from the gas, but some of the scrubbing liquid will, in turn, become entrained in the gas and will be carried out of the scrubber by the gas stream. This results in the loss of scrubbing liquid but also has other undesirable consequences arising from the presence of scrubbing liquid in the gas stream. Additionally, in wet scrubbers, the scrubbing liquid in the long run becomes super saturated with particulate matter, cutting down on the efficiency of the unit, and at the same time, easily fouling the scrubber internally as pointed out above. Wet scrubbers combined with clarifiers or other various forms of solid removal equipment are known. Efficient performance of such a unit is hindered by the amount of deposits of particulate solids which build-up on the interior surfaces of the unit tending to plug venturi sections or restricted clearance areas. Obviously, this cuts down on the flow of gas and fluids through the unit. Many wet scrubbers utilize concentric inlet and outlet chambers with the flue gas passing through the outer chamber, coming in contact with the scrubbing liquid, and then leaving the unit through the inner chamber. Units that utilize the outer chamber as their point of entry tend to become large as the cubic feed per minute increases, while units that utilize the inner chamber as their point of entry remain relatively small even with volume increases.

Among the references which may be considered in conjunction with this application are the following U.S. patents: U.S. Pat. Nos. 2,496,281; 2,259,030; 2,271,642; 2,551,890; 2,604,185; 2,792,905; 1,980,522; and 3,918,940.

SUMMARY OF INVENTION

A scrubber unit for contaminant-ladden air and gas having a generally cylindrical outer column or housing disposed over one end of a settling tank. Inside the main column is a central or internal column or flue through which the gases are brought in to the scrubber. Provision is made to introduce the incoming dirty gases tangentially into the inner column. The interior flue tapers inwardly towards its lower end where it terminates slightly above water level in the settling tank. Steam nozzles are provided at the lower end of the central column to prevent its plugging at the lower end. Gases are directed upwardly through spray water and a demister and exit the scrubber unit through a conventional stack. Additional spray means are provided around the lower part of the outer column for the purpose of introducing make-up water and chemical additives if needed. An included baffle extends at an angle downwardly below the scrubber unit and has at the upper end thereof a water diffuser header for directing water down its upper surface. The particulates are settled into the water and onto the baffle where they are moved off its lower end by the diffuser nozzles and settled to the bottom of the tank. The sediment and sludge is moved by conveyor means to a discharge location at the other end of the tank. Appropriate means are provided for controlled addition of make-up water and steam as desired and for recirculating water within the settling and clarifying tank.

Accordingly, it is among the many features of this invention to provide a novel, highly efficient and yet uniquely simple wet gas scrubber for the collection of effluents, emissions, pollutants, dust, fly ash and the many other types of fines and particulates in dirty gases. It is a further feature to provide a scrubber which complies with existing air pollution codes. The scrubber recirculates scrubbing liquid so that there is no need for costly use of fresh water although make-up water is employed. The unit is so designed so that there are no small vent holes, appertures or ventures for gas flow passage establishing areas at which the unit would be prone to plug. All openings are in fact large. The unit is highly economical to operate and maintain and requires minimum attention. The unit has no moving parts except in the sediment removal portion wherein the invention efficiently removes the sludge from the scrubber area to a discharge location. Because of the combination of wet scrubber and settling/clarifier tank the performance of the scrubber unit is greatly improved. The amount of liquid which will be carried out of the scrubber by the gas stream is decreased. The unit decreases the settling time of the residual, particulate solids in the liquid and as stated above, reduces the problem of plugging by solid deposits on the interior surfaces of the scrubbing unit.

BRIEF DESCRIPTION OF THE DRAWINGS

FIG. 2 is a top plan view along the line 2—2 of FIG. 1 in which a portion of the scrubber has been broken away to illustrate details of construction;

FIG. 3 is a partial view in elevation with a portion of the unit broken away to show additional details of construction; and FIG. 4 is a partial cross section view along the line 4—4 of FIG. 1 to show details of the demister area.

DESCRIPTION OF PREFERRED EMBODIMENT

Figure 1:
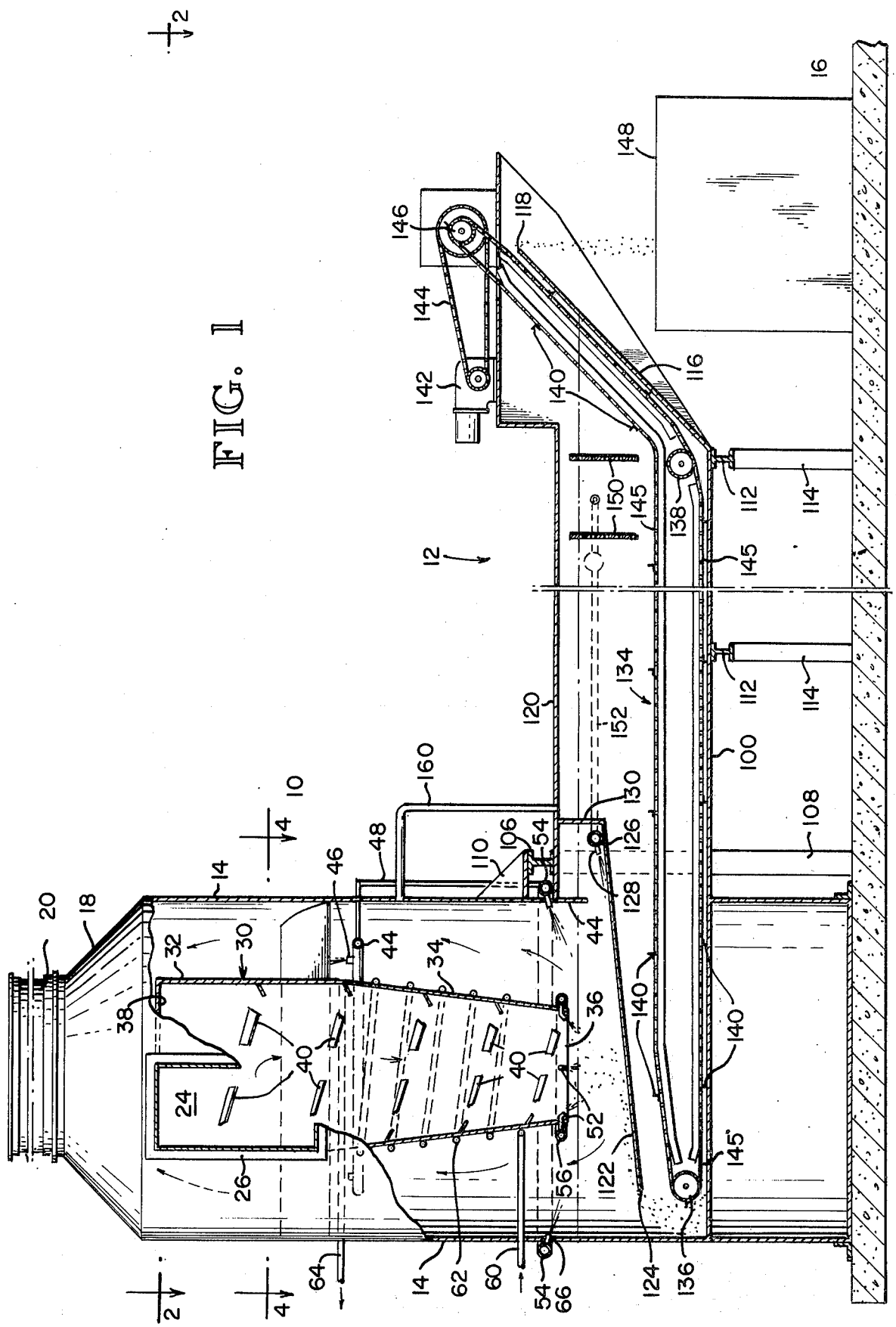
FIG. 1 is a side elevation view in cross section showing details of the scrubber unit and the settling and contaminant removal tank.

Referring now to the drawings it will be seen that the invention includes a scrubber unit generally designated by the number 10 and a settling and clarifier tank generally designated by the number 12. Scrubber unit 10 includes an outer cylindrical wall 14 which as can be seen extends upwardly from a concrete pad 16 to which it is affixed by anchor bolts or other appropriate securing means. The upper end of the column is provided with the inwardly angling top wall 18 which in turn is connected to a stack 20. The settling tank 12 actually extends into and under the scrubber unit as will be more fully understood hereinafter. A flue 22, best seen in FIG. 2, enters the scrubber from the dirty gas source and connects to a scrubber entrace duct 24 by connection to a flange 26. Entrance duct 24 opens into a central column designated by the number 30. Central column 30 extends approximately from the top of the scrubber downwardly to slightly above the water level in the settling tank. Central column 30 has an upper cylindrical section 32 which is approximately as deep as entrance duct 24 as best shown in FIG. 1. Column 30 also has a downwardly and inwardly tapering, lower conical section 34 which terminates above water level at lower open end 36. It will be seen from FIG. 1 and 2 that the gases from flue 22 entering central column through entrace duct 24 are introduced to the column tangentially, the upper end of the column 30 being closed off by top plate or wall 38. Thus, the dirty gases entering through opening 24 are swirled downwardly with the taper in the lower portion of column 30 being established so as to achieve a predetermined flue gas velocity for impingement on the scrubbing liquid. The cone or taper portion 34, as stated above, is terminated at a predetermined distance above the surface of the water, the level of which may vary depending upon the particular scrubbing application for which the unit is installed. In this way, the particulate-ladden gases entering the scrubbing unit inlet achieve centrifugal movement downwardly through the conical portion of the central column. Downward, whirling movement of the gases is assisted by deflectors 40 arranged serially in coil fasion from near opening 24 to the bottom edge 36 of column 30. In this way the gases are impinged directly against the water in the settling tank.

Central column 30 is supported within outer column wall 14 by demister vanes 42 which are secured as by welding to the outer surface of column 30 and the inner surface of outer column wall 14. The demister vanes 42 as can be seen are disposed at an angle to the diameter line and are further disposed at approximately a 45° angle from the vertical though this may vary depending upon the particular application of the scrubber unit. The demister vanes are located near the lower part of the upper portion 32 of the central column. The demister unit beside serving as a support for column 30 also functions to impart a swirling motion to gases passng through its vanes and thus to centrifugally separate entrained residual solids and water picked up by the gas stream. During operation of the scrubber the particulate solids and water recovered by the demister unit drain back into the settling tank. In time the particulate solids would tend to deposit on the vanes of the demister unit so that it would cease to work properly. For this reason it is necessary to locate a demister header 44 in this instance circular, around the underside of the vanes with a series of spaced nozzles 46 to keep the vanes clear. Water for header 44 is introduced through line 48.

Around the lower end of central column 30 is a steam header 50 having steam nozzles 52 extending to the interior to assist in keeping in the lower end of the central column free of sediment accumulation and build-up. Around the outside of outer column wall 14 is another water header 54 with a series of nozzles 56 for adding make-up water as it is required and for introducing additive chemicals if desired. It will be noted that the connector pipe 48 supplying the demister header 44 is connected to make-up water header 54. A depending wall 45 comprising an extension of wall 14 extends across the width of the tank and terminates below the water surface. In this way, the interior of the scrubber is maintained in a sealed condition from the atmosphere. An economizer cold water supply is introduced to the coiled pipe around the outside of the conical section 34 of central column 30. Cold water enters as for instance through inlet pipe 60, is circulated around the conical section through pipe coils 62 and is taken off as hot water through outlet pipe 64. The economizer passing through central column to assist in cooling the gases coming into the unit.

A water pipe spply line 79, best seen in FIG. 2, terminates at header 54 around the lower outside of the outside column. Both water make-up header 54 and demister header 44 are supplied water through make-up line 70. Addition of make-up water will be regulated by the control station to which incoming water line 70 is directed. There is included in the controls a float control valve 72 connected to water level float 73, a Y-type strainer 74, two gate valves 76 one of which is up stream and one of which is down stream of the flow control valve 72. A by-pass globe valve 78 is provided for manual operation if needed. From these controls the water proceeds via line 79 to header 54 and then via line 48 to demister header 44.

In order to prevent the build-up of solids at the lower end of the central column 30 saturated steam is introduced through nozzles 52 from header 50 surrounding the lower outer wall of the conical section near edge 36. A line 80 is connected to a source of steam for blowing down the lower portion of the central column at predetermined intervals. This intermittent emission of saturated steam is achieved through a control system comprising valve 82 operated by solenoid 84 which in turn is connected to timer 86. Gate valves 88 are located up stream and down stream of the normally closed valve 82. A normally closed globe valve 90 is provided in a by-pass line. The steam is admitted to header 50 through feeder line 92. It will be understood that the operator sets the timer 86 at a desired blow down interval and also sets the duration of the operation. The timer 86 thereafter automatically at the predetermined intervals sends an electrical signal to the solenoid causing it to open valve 82 to introduce steam to the cleaning nozzles 52. In both of the control stations just described, that is the steam control station and the make-up water control station, if either the valve 82 or the float control valve 72 malfunction, an operator can close the respective gate valves on either side and open the respective by-pass glove valves 78 and 90. This enables manual performance of the intended functions of the respective control stations.

The settling and clarifier tank 12 is of a size sufficient to permit retention of water which is processed through the scrubber unit for the desired time, which in turn or course depends upon the particular application and the size of particulate matter being removed. The settling/-clarifier tank has a bottom wall 100, and side walls 102 and 104. As can be seen, the lower part of the outer column 14 supports the end of the tank 12 under the scrubber unit. Since the tank in effect extends into the scrubber unit, thus opening one side of the outer column wall 14, additional support is given to the scrubber by a spanning beam 106 supported at each end by vertical legs 108. Appropriate gusset plates 110 interconnect column wall 14 and spanning beam 106 to give the scrubber necessary support. Additional supporting frame members for the tank are provided by beans 112 under tank bottom wall 100 again supported by vertical legs 114 which rest on the concrete pad or foundation 16. At the outer end of settling tank 12 and extending upwardly from bottom wall 100 is an upwardly and angling wall 116 which terminates at an upper edge 118. The tank 12 is provided with a cover wall 120.

Within the tank is a downwardly sloping baffle extending generally from beneath support beam 106 at an angle downwardly and under central column 30. Baffle 122 terminates at its outer end 124 a sufficient distance from scrubber outer wall 14 so that sediment and sludge are able to settle off the end and onto the tank bottom. At the upper end of the baffle, which extends from side to side up the tank, is a diffuser header 126 with diffuser nozzles 128 the purpose of which are to send a continuous, circulating current of water down the upper surface of the baffle. It will be noted that a vertical wall 130, extending across the full width of the tank is provided behind the header 126 at the upper end of the baffle 122 in order to prevent flow of water in a direction other than down the baffle surface.

A chain conveyor generally designated by the number 134 is provided within the tank with spaced idler sprockets 136 and 138 around which two parallel chains are disposed. On the chain conveyor is mounted a series of transversey extending scrapers 140. The chain is driven by a motor 142 interconnected by chain drive 144 to chain drive sprockets 146 at the upper and outer end of the tank. The conveyor scrapers 140 move counterclockwise so that the bottom flight of the conveyor moves from under the scrubber unit to the other end of the tank. The sediment is forced along the bottom by the scrapers and is discharged over the end 118 of wall 116 into a container, box and/or truck 148. In FIG. 2 it will be seen that float 73 connected to float valve 72 in the make-up water control station is located between side walls 102 and 104 above the surface of the water and below water level but above conveyor 134.

Baffle 122 and diffuser nozzles 128 force particulate matter in the water downwardly in the direction of the slope thus reducing turbidity and decreasing the time required for the solids to settle and form a sludge at the bottom of the settling tank. Particulate solid formations could occur so header 126 with its diffuser nozzles 128 prevents accumulations or build-ups or solids formation on the baffle in addition to aiding in the settling process. Water is constantly drawn from the baffled section of the tank through line 152 which is connected to recirculating pum 154 driven by motor 156 with line 152 then being connected to header 126 for continuous recirculation of the water.

In operation the settling and clarifier tank is filled with water to a specified level. Particulate-ladden flue gs is delivered to the scrubber inlet 24 by an induced draft fan (not shown) so that the scrubber unit 10 is under positive pressure. sure. Recirculating pump 154 begins to pump water from between the vertical baffles 150 through the header 126 and nozzles 128 thus creating a counterclockwise movement in the stream of water. The flue gas stream enters the scrubber unit tangentially through the central column 30 causing a clockwise centrifugal movement of the main body of gas. The centrifugal movement is further developed by the deflectors 40 in a downwardly spiraling pattern. The tapered or conical section shape of the lower section of column 30 causes velocity of the flue gases to gradually increase as they approach the lower end 36. The centrifugal movement developed inside the inner chamber causes the heavier praticulates to be separated from the main body of the gas stream and pushed to the outer walls of the inner chamber, a downward movement that follows the direction of the flow but the same time obeying the laws of gravity. The flue gas impinges the water at the lower portion of the scrubbing unit and then exists through the space between the inner column and the outer column. The gases are further cleaned on their way up through the demister vanes 42 which cause a violent centrifugal counterclockwise whirling motion throwing residual particulate solids and moister against the inner surface of the wall 14 where they drain back into the settling tank. Make-up water frame spray nozzles 46 in the demister header prevent deposition of particulate solids on the vanes and aid in the removal of residual solids from the gas stream. Make-up water is also introduced from the lower outside header 54 and nozzles 56 to maintain a constant water level and through which appropriate chemicals may be introduced if necessary for the control and dispersion of emulsions and/or foam on the surface of the water.

Again, the amount of make-up water to be introduced is controlled by means of float 73 and float control valve 72. At the bottom of the conical section of the central column intermittent steam is introduced with the primary function of controlling solids built-up at the lower end of the central column. The internal pressure throughout the system is maintained constant by means of a pressure equilizer line 160 extending between the top of the settling and clarifier tank and the inside of the scrubber as shown best in FIG. 1. In the settling tank the conveyor 134 is generally operated intermittently to remove sludge deposits accumulated on the bottom of the settling tank.

What is claimed is:

1. A scrubber unit for removing solid particulates and contaminants from air and gas, comprising:
   a. a settling and clarifying tank for containing water including a scrubber section and a discharge section, said tank having bottom and side walls and being provided with conveyor means for moving sediment from the scrubber section to the discharge section,
   b. a scrubber unit mounted on and supported by said tank, said scrubber unit including:
      1. an outer generally vertically disposed cylindrical housing wall defining an outer column, said outer column having an upper end which is enclosed except for an exhaust stack through which cleaned gas and air are exited from said scrubber unit, and a lower end which opens into and forms a part of said tank,
      2. a central column disposed generally concentrically inside said outer column having a generally cylindrical upper section and a generally inwardly and downwardly tapering frusto-conical section, the upper end of said central column being closed and the lower end being open and terminating a predetermined distance above the water in said tank, said upper section having an offcenter opening for tangential introduction of incoming gases thereto and said column having deflector means in a downwardly spiraling pattern on the inside surface thereof.
   c. support means for said central column extending between the outside of said central column and the inside of said outer column, and d. baffle means in said tank beneath said central column and below the water level and angling downwardly in a direction away from the discharge end and terminating above said conveyor.

2. The scrubber unit according to claim 1 and in which said tank has a cover thereover and wherein a pressure equilizer line extends between the inside of said outer column and the inside of said tank above water level.

3. The scrubber unit according to claim 1 and in which said baffle extends from side to side of said tank and wherein at its upper end it is attached to a vertical wall extending between the sides of said tank so that water can circulate only off the lower end thereof.

4. The scrubber unit according to claim 3 and in which a diffuser header and nozzles are located at the upper end of said baffle for circulating water down along the length of said baffle to its lower end.

5. The scrubber unit according to claim 1 and in which a steam header is provided generally around the lower end of the conical section of said central column with nozzles therefrom extending to the interior of said column for periodically emitting steam to clear away solids accumulations and build-ups.

6. The scrubber unit according to claim 5 and in which a water make-up header and nozzles are provided around the lower portion of said outer column above water level for maintaining the desired water level in said tank and for adding chemicals to said water when desired.

7. The scrubber unit according to claim 1 and in which said support means for said central column comprises a series of spaced apart vanes for demisting gases exiting from said scrubber, said vanes being located generally around the lower part of the upper section of said central column.

8. The scrubber unit according to claim 7 and in which a water header means with upwardly directed nozzles is provided just below said vanes for maintaining said vanes free of solids accumulations and said header being connected to a water line.

* * * * *